(12) United States Patent
Koerner et al.

(10) Patent No.: US 7,543,951 B2
(45) Date of Patent: Jun. 9, 2009

(54) METHODS AND APPARATUS FOR PROVIDING A LUMINOUS WRITING SURFACE

(75) Inventors: Brad E. Koerner, Boston, MA (US); Kevin J. Dowling, Westford, MA (US)

(73) Assignee: Philips Solid-State Lighting Solutions, Inc., Burlington, MA (US)

( * ) Notice: Subject to any disclaimer, the term of this patent is extended or adjusted under 35 U.S.C. 154(b) by 172 days.

(21) Appl. No.: 11/741,986

(22) Filed: Apr. 30, 2007

(65) Prior Publication Data

US 2007/0258231 A1     Nov. 8, 2007

Related U.S. Application Data

(60) Provisional application No. 60/797,182, filed on May 3, 2006.

(51) Int. Cl.
*F21V 33/00* (2006.01)
*A47B 19/00* (2006.01)

(52) U.S. Cl. .......................... 362/99; 362/98; 362/276; 362/253

(58) Field of Classification Search ............... 362/99, 362/600, 601, 612, 27, 98, 253, 800, 276, 362/394, 802; 281/39, 51; 206/472, 232; 345/179, 82, 84; 40/452
See application file for complete search history.

(56) References Cited

U.S. PATENT DOCUMENTS

| | | | |
|---|---|---|---|
| 4,969,068 A * | 11/1990 | Williams | ...................... 362/99 |
| 5,024,898 A | 6/1991 | Pitts et al. | |
| 5,037,702 A | 8/1991 | Pitts et al. | |
| 5,502,623 A * | 3/1996 | Brotz | ........................... 362/99 |
| 5,900,094 A | 5/1999 | Santini et al. | |
| 6,016,038 A | 1/2000 | Mueller et al. | |
| 6,150,774 A | 11/2000 | Mueller et al. | |
| 6,166,496 A | 12/2000 | Lys et al. | |
| 6,211,626 B1 | 4/2001 | Lys et al. | |
| 6,241,360 B1 * | 6/2001 | Merrell | ......................... 362/99 |
| 6,292,901 B1 | 9/2001 | Lys et al. | |
| 6,340,868 B1 | 1/2002 | Lys et al. | |
| 6,459,919 B1 | 10/2002 | Lys et al. | |
| 6,528,954 B1 | 3/2003 | Lys et al. | |
| 6,548,967 B1 | 4/2003 | Dowling et al. | |
| 6,577,080 B2 | 6/2003 | Lys et al. | |
| 6,608,453 B2 | 8/2003 | Morgan et al. | |
| 6,624,597 B2 | 9/2003 | Dowling et al. | |
| 6,717,376 B2 | 4/2004 | Lys et al. | |
| 6,720,745 B2 | 4/2004 | Mueller et al. | |
| 6,774,584 B2 | 8/2004 | Lys et al. | |
| 6,777,891 B2 | 8/2004 | Lys et al. | |
| 6,781,329 B2 | 8/2004 | Morgan et al. | |
| 6,788,011 B2 | 9/2004 | Mueller et al. | |
| 6,801,003 B2 | 10/2004 | Schanberger et al. | |
| 6,806,659 B1 | 10/2004 | Mueller et al. | |
| 6,869,204 B2 | 3/2005 | Piepgras et al. | |
| 6,883,929 B2 | 4/2005 | Dowling | |
| 6,888,322 B2 | 5/2005 | Dowling et al. | |

(Continued)

*Primary Examiner*—Jacob Y Choi

(57) ABSTRACT

Disclosed herein are methods and apparatus for providing a luminous writing surface, whose color, color temperature, and/or brightness are controlled to achieve a desired contrast between the writing surface and markings removably made thereon. For example, LED-based light sources and/or LED-based controllable lighting units can be employed to backlight or edge-light a transparent or translucent material thereby providing the luminous writing surface.

14 Claims, 5 Drawing Sheets

U.S. PATENT DOCUMENTS

| | | |
|---|---|---|
| 6,897,624 B2 | 5/2005 | Ducharme et al. |
| 6,936,978 B2 | 8/2005 | Morgan et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,113,541 B1 | 9/2006 | Lys et al. |
| 2002/0038157 A1 | 3/2002 | Dowling et al. |
| 2002/0048169 A1 | 4/2002 | Dowling et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0093814 A1* | 7/2002 | Egli ............................ 362/99 |
| 2002/0130627 A1 | 9/2002 | Dowling et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0158583 A1 | 10/2002 | Lys et al. |
| 2002/0163798 A1* | 11/2002 | Richards ...................... 362/98 |
| 2002/0176259 A1 | 11/2002 | Ducharme |
| 2003/0011538 A1 | 1/2003 | Lys et al. |
| 2003/0028260 A1 | 2/2003 | Blackwell |
| 2003/0057884 A1 | 3/2003 | Dowling et al. |
| 2003/0057887 A1 | 3/2003 | Dowling et al. |
| 2003/0076281 A1 | 4/2003 | Morgan et al. |
| 2003/0100837 A1 | 5/2003 | Lys et al. |
| 2003/0133292 A1 | 7/2003 | Mueller et al. |
| 2003/0222587 A1 | 12/2003 | Dowling et al. |
| 2004/0036006 A1 | 2/2004 | Dowling |
| 2004/0052076 A1 | 3/2004 | Mueller et al. |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0116039 A1 | 6/2004 | Mueller et al. |
| 2004/0130909 A1 | 7/2004 | Mueller et al. |
| 2004/0178751 A1 | 9/2004 | Mueller et al. |
| 2004/0212320 A1 | 10/2004 | Dowling et al. |
| 2004/0212993 A1 | 10/2004 | Morgan et al. |
| 2005/0099824 A1 | 5/2005 | Dowling et al. |
| 2005/0116667 A1 | 6/2005 | Mueller et al. |
| 2005/0151489 A1 | 7/2005 | Lys et al. |
| 2005/0213352 A1 | 9/2005 | Lys et al. |
| 2005/0213353 A1 | 9/2005 | Lys |
| 2005/0218838 A1 | 10/2005 | Lys |
| 2005/0218870 A1 | 10/2005 | Lys |
| 2005/0219872 A1 | 10/2005 | Lys |
| 2005/0231133 A1 | 10/2005 | Lys |
| 2005/0236029 A1 | 10/2005 | Dowling |
| 2005/0236998 A1 | 10/2005 | Mueller |
| 2005/0253533 A1 | 11/2005 | Lys et al. |
| 2005/0275626 A1 | 12/2005 | Mueller |
| 2005/0276053 A1 | 12/2005 | Nortrup |
| 2006/0002110 A1 | 1/2006 | Dowling |
| 2006/0012987 A9 | 1/2006 | Ducharme |
| 2006/0016960 A1 | 1/2006 | Morgan |
| 2006/0022214 A1 | 2/2006 | Morgan |
| 2006/0050509 A9 | 3/2006 | Dowling |
| 2006/0076908 A1 | 4/2006 | Morgan |
| 2006/0098077 A1 | 5/2006 | Dowling |
| 2006/0104058 A1 | 5/2006 | Chemel et al. |
| 2006/0109649 A1 | 5/2006 | Ducharme et al. |
| 2006/0132061 A1 | 6/2006 | McCormick et al. |
| 2006/0152172 A9 | 7/2006 | Mueller |
| 2006/0158881 A1 | 7/2006 | Dowling |
| 2006/0198128 A1 | 9/2006 | Piepgras et al. |
| 2006/0208667 A1 | 9/2006 | Lys |
| 2006/0262516 A9 | 11/2006 | Peipgrad |
| 2006/0262521 A1 | 11/2006 | Piepgras |
| 2006/0262544 A1 | 11/2006 | Piepgras |
| 2006/0262545 A1 | 11/2006 | Piepgras |
| 2006/0273741 A1 | 12/2006 | Stalker, III |
| 2006/0285325 A1 | 12/2006 | Ducharme et al. |
| 2007/0115650 A1* | 5/2007 | Cohan et al. ................. 362/99 |

* cited by examiner

METHODS AND APPARATUS FOR PROVIDING A LUMINOUS WRITING SURFACE

CROSS-REFERENCE TO RELATED APPLICATION

This application claims the benefit under 35 U.S.C. §119 (e) of U.S. provisional application Ser. No. 60/797,182, filed on May 3, 2006, which is hereby incorporated herein by reference.

TECHNICAL FIELD

The present invention is generally directed to reusable writing surfaces, and, more particularly, to methods and apparatus for providing a luminous writing surface, including those employing LED-based light sources.

BACKGROUND

The term "whiteboard" commonly refers to any surface, typically glossy and most commonly colored white, where markings can be made. Whiteboards operate analogously to chalkboards, in that they allow markings that temporarily adhere to the surface of the board and that can be easily removed. Whiteboards often are employed in teaching environments (e.g., classrooms) as well as office environments, as they provide useful tools for communication in connection with pedagogy, problem solving, collaborative design, and the like. Whiteboards usually are made of plastic, melamine-coated pressboard, or steel coated with enamel or ceramic material, commonly referred to as "porcelain steel." Steel whiteboards generally are magnetic, so magnets may be employed to affix notes or a magnetic eraser to them. Glass also provides a smooth, hard and erasable surface that has a surface quality suitable for whiteboard applications.

Instead of using chalk (as on chalkboards) to make the markings, a special whiteboard marker containing removable (non-permanent) ink having a variety of colors is typically used (these markers also are referred to as "dry-erase markers"). In general, whiteboard ink markings are less susceptible to external influences, such as water or accidental erasure, because the ink adheres slightly more strongly than chalk adheres to chalkboards. The ink is also less messy than chalk (which generates chalk dust during use and erasure).

In some applications, a whiteboard may be used as a projection screen, essentially serving as the background for a presentation generated by a projector (e.g., an overhead projector). In such an application, markings or writing may be made "on top of" the projected image so as to be superimposed on the image (e.g., blanks may be filled in or comments written on or adjacent to the projected material). Interactive whiteboards such as a PolyVision Walk-and-Talk, Promethean ACTIVboard, or SMART Board allow a computer display to be projected onto a whiteboard using a projector. In some instances however, projecting an image onto a whiteboard can produce a glare, making the image and/or superimposed markings difficult to read. Also, more generally, the white background of a whiteboard (with or without an image projected thereon) may cause contrast problems for people with vision impairment.

Most whiteboards provide temporary viewing of markings that can be easily erased if appropriate whiteboard markers are used. Some types of whiteboards, however, may be equipped with side-mounted scanners that allow the markings to be saved electronically for printing or viewing on a computer.

Whiteboards generally require a certain level of surface luminance to create a proper contrast ratio between the markings or writing made by an appropriate marker and the base surface of the whiteboard that provides a background. Typically, this is achieved "naturally" using lighting from an external light source that irradiates the whiteboard writing surface and is reflected outwards from it at a semi-diffuse angle of incidence. Thus, the appearance of the overall color scheme of conventional whiteboards and the contrast ratio between markings thereon and the background depends on this external lighting. Accordingly, the overall appearance of the whiteboard typically matches the ambient lighting.

SUMMARY

Various embodiments of the present invention are directed to methods and apparatus for providing a luminous writing surface. As an alternative to conventional whiteboards as discussed above, Applicants have recognized and appreciated that a desired contrast between a writing surface and markings made thereon may be achieved by providing a luminous writing surface in which the color, color temperature, and/or brightness of the writing surface may be controlled. In some exemplary embodiments, one or more LED-based light sources and/or LED-based controllable lighting units are employed to irradiate translucent or transparent material on which markings or writing may be made, so as to provide a luminous writing surface.

Generally, in one aspect, the invention focuses on a luminous apparatus including an essentially planar member having a front surface, at least one side surface, and a back surface. The front surface of the essentially planar member includes a writing surface configured to receive a removable marking thereon. The apparatus further includes at least one light source associated with the essentially planar member for irradiating the side surface and/or the back surface thereof with visible light perceivable by an observer from the front surface. The visible light provides at least one background color for the marking when received on the writing surface. The essentially planar member may include a substantially translucent or transparent material.

In various embodiments of this aspect of the invention, the light source includes at least one LED-based light source. The apparatus may further include at least one controller electrically coupled to the at least one light source and configured to control at least one of a color, a color temperature and an intensity of the visible light so as to provide the at least one background color for the at least one marking.

In another aspect, the invention features a method for making a marking on a writing surface including the acts of (A) providing an essentially planar member having a front surface, at least one side surface, and a back surface, the front surface including the writing surface; (B) irradiating the side surface and/or the back surface of the essentially planar member with visible light from a light source perceivable by an observer from the front surface; and (C) making the marking on the writing surface such that the visible light provides at least one background color for the marking. The method may further include the act of controlling the at least one background color to alter the contrast between the marking and the writing surface.

As used herein for purposes of the present invention, the term "LED" should be understood to include any electroluminescent diode or other type of carrier injection/junction-based system that is capable of generating radiation in response to an electric signal. Thus, the term "LED" includes, but is not limited to, various semiconductor-based structures that emit light in response to current, light emitting polymers, organic light emitting diodes (OLEDs), electroluminescent strips, and the like. In particular, the term "LED" refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this description, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 150-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The terms "lighting unit" and "lighting fixture" are used interchangeably herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present invention include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects and embodiments of the present invention. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations and embodiments of the present invention include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Various embodiments of the present invention are described below include certain embodiments relating particularly to LED-based light sources. It should be appreciated, however, that the present invention is not limited to any particular manner of implementation, and that the various embodiments discussed explicitly herein are primarily for purposes of illustration. For example, the various concepts discussed herein may be suitably implemented in a variety of environments involving LED-based light sources, other types of light sources not including LEDs, environments that involve both LEDs and other types of light sources in combination, and environments that involve non-lighting-related devices alone or in combination with various types of light sources.

Figure 1A:
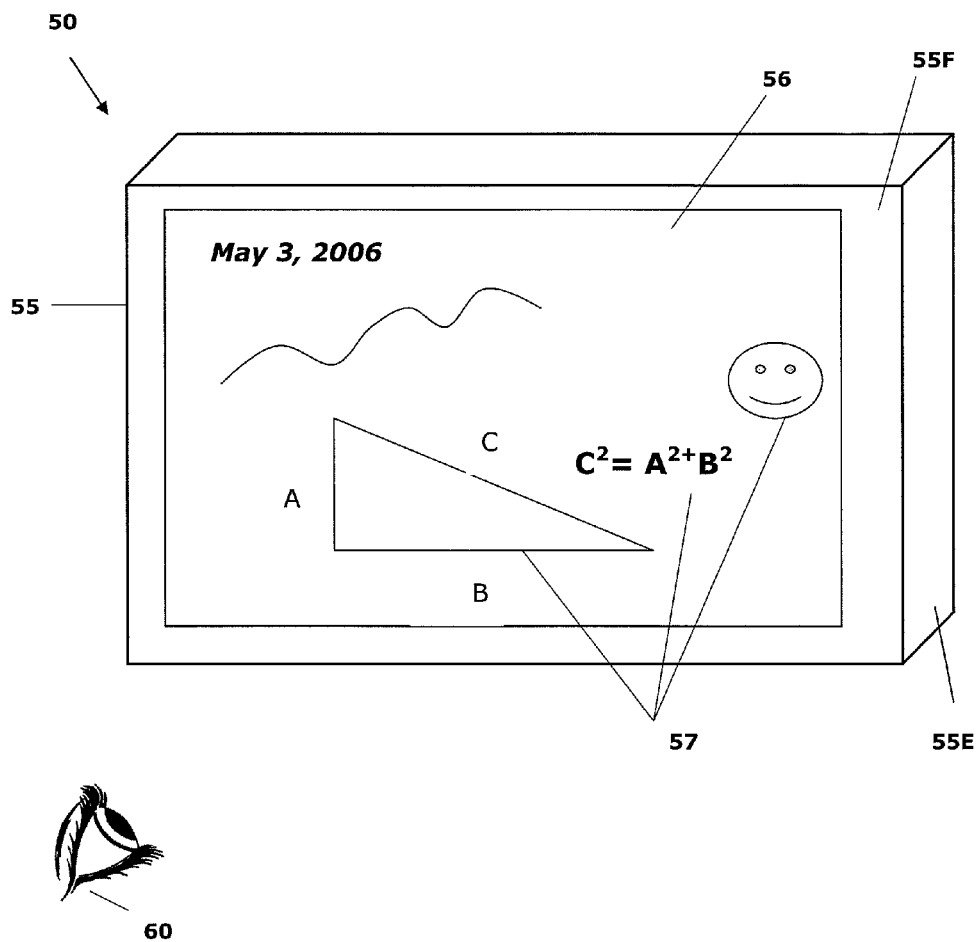
FIGS. 1A-1B generally illustrate front and back perspective views, respectively, of an apparatus having a luminous writing surface according to various embodiments of the present invention.
Figure 1B:
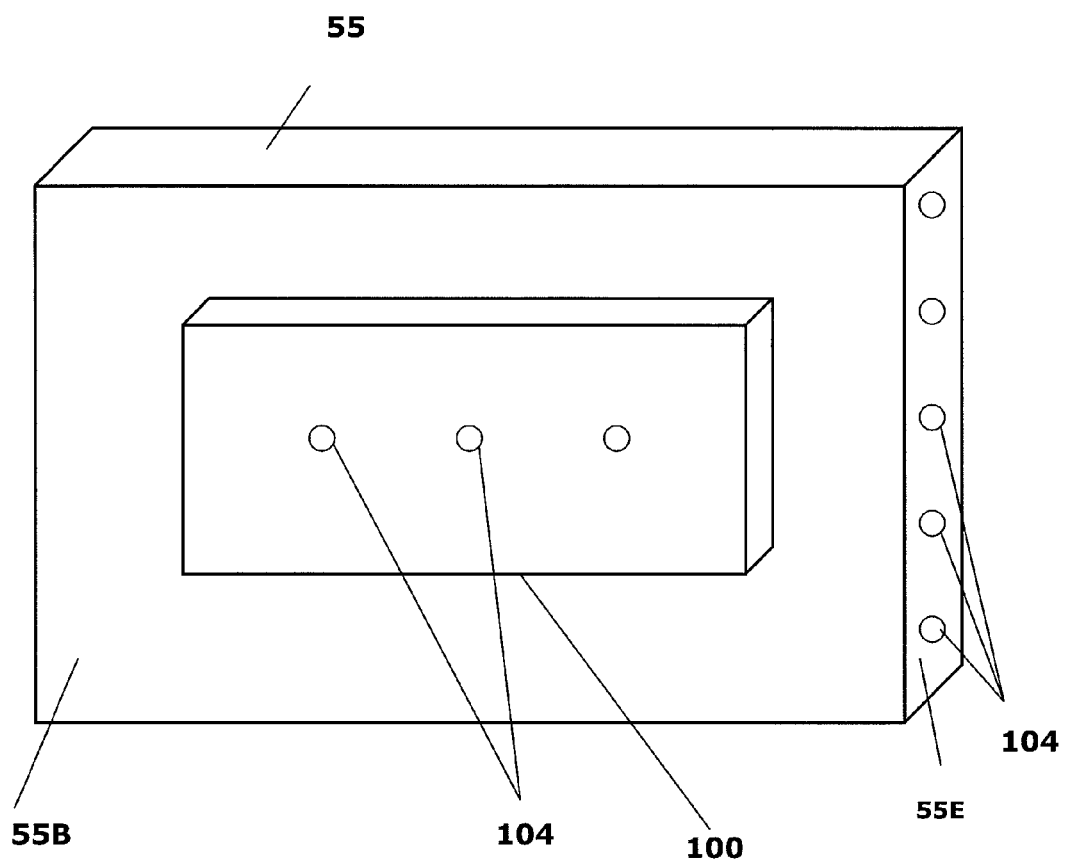

FIGS. 5A-1B generally illustrate front and back perspective views, respectively, of an apparatus 50 according to various embodiments of the present invention. The apparatus 50 includes an essentially planar member 55 having a front surface 55F, a side surface (also referred to as an "edge") 55E and a back surface 55B. The apparatus further includes one or more light sources 104, and/or one or more lighting units 100, disposed with respect to the planar member 55 so as to irradiate its back surface 55B and/or the edge 55E, with visible light. In many embodiments, the visible light is perceivable by an observer 60 from the front surface 55F.

In various embodiments, the essentially planar member 55 includes, or consists essentially of, a substantially transparent or translucent material that is illuminated from behind ("back-lit") and/or from the side ("edge-lit") so as to create a diffused, even plane of luminance for the front surface 55F. In some embodiments, the member 55 includes a transparent or translucent rigid material, for example, glass. In other embodiments, the material is flexible so as to generally conform to an underlying surface or wall. In particular embodiments, the planar member is made in whole or in part from translucent plastic such as polycarbonate or acrylic. In still other embodiments, an optical film or other optical media (not shown) is disposed over the back surface and/or the side surfaces of the member 55 to improve diffusion and create an essentially homogeneous luminance from the light generated by the one or more light sources or lighting units. In yet other embodiments, one or more of the surfaces of the member 55 is mechanically altered to provide a structure for interfering with and/or redirecting light to facilitate diffuse luminance. Alternatively or additionally, a pattern may be screen-printed on one or more surfaces of the member 55 (e.g., a half-tone pattern may be printed on one side of the material) to facilitate diffuse luminance. Also, a transparent coating can be disposed over the writing surface 56 to enhance its visual appearance, protect against scratches and abrasion, and/or improve ink adhesion and removal. In one particular embodiment, this coating is formed of melamine-based material. From the foregoing, it should be appreciated that in various aspects the essentially planar member may be configured to both facilitate diffusion of the visible light over a substantial portion of the writing surface 56 and receive the removable marking(s) 57 over the substantial portion of the writing surface.

The front surface 55F of the essentially planar member 55 includes, or essentially constitutes, a writing surface 56 on which one or more markings 57 (e.g., words, figures, shapes, etc.) can be made and from which these markings can be removed or erased without compromising the integrity of the writing surface. In various embodiments, the visible light illuminating the front surface 55F from the back surface 55B and/or the edge 55E through the member 55 provides at least one background color for the one or more markings 57.

As shown in FIGS. 1A and 1B, in some embodiments, one or more light sources 104 may be optically coupled to or otherwise integrated with one or more edges 55E of the member 55 to provide the visible light for the luminous writing surface. Although FIGS. 1A-1B show periodically spaced sources 104 integrated along an edge of the apparatus, it should be appreciated that the particular number and arrangement of sources shown in the these Figures is provided primarily for purposes of illustration, and that the invention is not limited to any particular number and arrangement.

Figure 2:
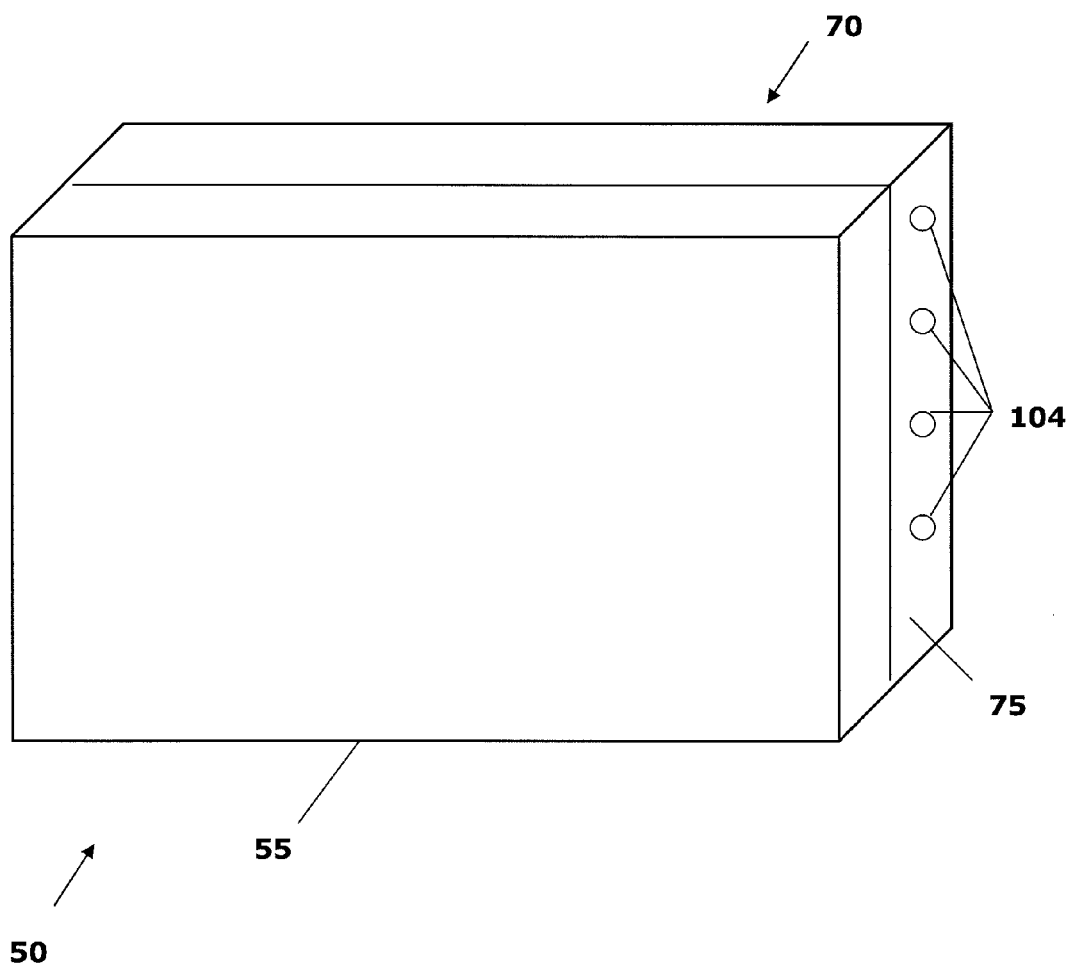
FIG. 2 illustrates an alternative embodiment of the apparatus shown in FIGS. 1A-1B.

Referring to FIG. 2, in some embodiments, the member 55 may be coupled to one or more other structural components constituting the apparatus 50; for example, the apparatus 50 may include a housing 70 having a number of sides, a top, and a bottom, wherein the planar member constitutes the front side of the housing. As shown in FIG. 2, in one embodiment, one or more light sources 104 may be coupled to a side 75 of the housing and positioned so as to irradiate the member 55, without being directly coupled to, or otherwise physically integrated, with the planar member 55. In one exemplary implementation, the apparatus 50 may be constructed as a complete or nearly complete furniture unit assembly that is either permanently installed in an architectural space, or is a free-standing piece of furniture.

Still referring to FIG. 2, as well as FIGS. 1A-1B, the apparatus 50 employs one or more lighting units 100, including one or more light sources 104 as well as one or more components for facilitating control of the light sources. In some embodiments, one or more of the control components of a particular lighting unit 100 also may be employed to facilitate control of other light sources 104, which may or may not be part of the lighting unit itself, but otherwise disposed with respect to the member 55 (e.g., along or proximate to one or more edges) to provide visible light. As shown in FIGS. 1A-1B, one or more lighting units 100 may be disposed in a plane essentially parallel to the member 55 so as to back-light the back surface 55B. In various aspects, the lighting unit(s) may be coupled directly to the member 55 or otherwise disposed in a housing for the apparatus (e.g., coupled to a structural component of the housing) so as to irradiate the back surface 55B. Additionally or alternatively, one or more lighting units 100 may be disposed so as to provide edge-lighting of the member 55.

Examples of suitable light sources for the one or more light sources include, but are not limited to, cold-cathode light sources, fluorescent light sources, electroluminescent light sources, and semiconductor-based light sources. In one particular implementation, the back surface of the plane of material may be coated with one or more phosphor layers that, when employed in combination with an appropriate source of light (e.g., light having a wavelength or wavelengths that excite phosphors in the one or more phosphor layers) provide a luminous writing surface.

Lighting units 100 may include one or more controllers to control one or more light sources to generate a variety of colors and brightness levels (intensity) of the visible light that irradiates the plane of material. As discussed above, this visible light in turn provides one or more background colors for the markings 57 made on the writing surface 56. In this manner, variable colored light and/or variable color temperature white light may be employed with variable intensity to provide the one or more background colors. The apparatus further may be equipped with a user interface (discussed below in connection with FIG. 3) to enable a user to adjust one or more of color, color temperature, and luminance brightness. Alternatively, one or more of color, color temperature and brightness may be set and fixed at predetermined levels to match the ambient lighting in an environment in which the luminous writing surface apparatus 50 is installed.

As mentioned above, the color of the visible light generated by one or more light sources may include one or more non-white colors as well as essentially white light. One or more lighting unit controllers may be configured to control the background color(s) for the at least one marking based at least in part on ambient light in an environment around the apparatus, and/or a color of the ink constituting one or more markings. For example, the background color(s) may be controlled so as to increase a contrast between the at least one marking and the writing surface, or to significantly decrease a visibility of one or more markings. In one exemplary use, multiple markings may be made using different colors of ink, and the background color(s) may be controlled so as to increase a contrast between the at least two markings, or render one marking of the at least two markings essentially invisible. In another exemplary use, various dynamic lighting effects can be generated by the light sources 104 in a manner described in more detail below to enhance the visual appearance of the writing surface and the user's experience.

In some embodiments, one or more of the light sources may be LEDs, and/or one or more LEDs may be arranged as an LED-based lighting unit. In various aspects, such a lighting unit may be configured with a variety of features to facilitate operation of the luminous writing surface apparatus. Following below is a discussion of exemplary LED-based lighting units that may be employed in a luminous writing surface apparatus according to the present invention. Additionally, it should be appreciated that many of the features and concepts discussed below in connection with LED-based lighting units may be utilized with other types of light sources, and implemented in a variety of manners, to facilitate selection and control of color, color temperature, and/or intensity of one or more background colors for the luminous writing surface.

Figure 3:
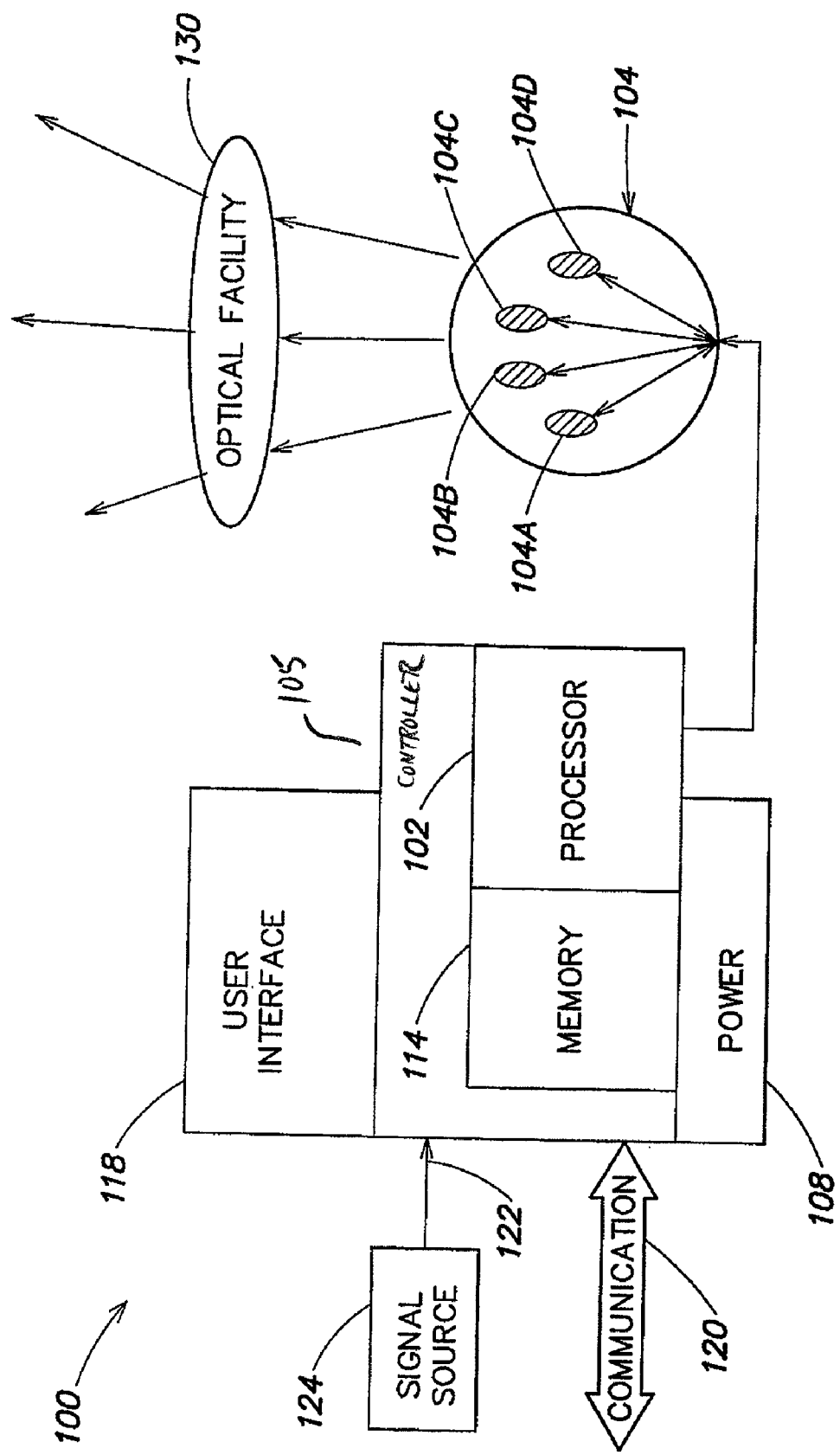
FIG. 3 is a diagram illustrating a lighting unit according to some embodiments of the present invention that may be employed in the apparatus shown in FIGS. 1A-1B and 2.

Referring to FIG. 3, in many embodiments of the present invention, various components of a lighting unit 100 may be employed together with the essentially planar member 55 to provide a luminous writing surface apparatus as shown in FIGS. 1A-1B and 2. Some general examples of LED-based lighting units similar to those that are described below in connection with FIG. 3 and suitable for use in the apparatus 50 are disclosed, for example, in U.S. Pat. No. 6,016,038, issued Jan. 18, 2000 to Mueller et al., entitled "Multicolored LED Lighting Method and Apparatus," and U.S. Pat. No. 6,211,626, issued Apr. 3, 2001 to Lys et al, entitled "Illumination Components," both patents being incorporated herein by reference.

As shown in FIG. 3, in some embodiments, the lighting unit 100 includes one or more light sources 104A, 104B, 104C, and 104D (shown collectively as 104), wherein one or more of the light sources may be an LED-based light source that includes one or more light emitting diodes (LEDs). In one aspect of this embodiment, any two or more of the light sources may be adapted to generate radiation of different colors (e.g. red, green, blue); in this respect, as discussed above, each of the different color light sources generates a different source spectrum that constitutes a different "channel" of a "multi-channel" lighting unit. Although four light sources 104A, 104B, 104C, and 104D, are shown in FIG. 3, it should be appreciated that the lighting unit is not limited in this respect, as different numbers and various types of light sources (all LED-based light sources, LED-based and non-LED-based light sources in combination, etc.) adapted to generate radiation of a variety of different colors, including essentially white light, may be employed in the lighting unit 100, as discussed further below.

Still referring to FIG. 3, the lighting unit 100 also may include a controller 105 that is configured to output one or more control signals to drive the light sources so as to generate various intensities of light from the light sources. For example, in one implementation, the controller 105 may be configured to output at least one control signal for each light source so as to independently control the intensity of light (e.g., radiant power in lumens) generated by each light source; alternatively, the controller 105 may be configured to output one or more control signals to collectively control a group of two or more light sources identically. Some examples of control signals that may be generated by the controller to control the light sources include, but are not limited to, pulse modulated signals, pulse width modulated signals (PWM), pulse amplitude modulated signals (PAM), pulse code modulated signals (PCM) analog control signals (e.g., current control signals, voltage control signals), combinations and/or modulations of the foregoing signals, or other control signals. In one aspect, particularly in connection with LED-based sources, one or more modulation techniques provide for variable control using a fixed current level applied to one or more LEDs, so as to mitigate potential undesirable or unpredictable variations in LED output that may arise if a variable LED drive current were employed. In other embodiments, the controller 105 may control other dedicated circuitry (not shown in FIG. 3) which in turn controls the light sources so as to vary their respective intensities.

In general, the intensity (radiant output power) of radiation generated by the one or more light sources is proportional to the average power delivered to the light source(s) over a given time period. Accordingly, one technique for varying the intensity of radiation generated by the one or more light sources involves modulating the power delivered to (i.e., the operating power of) the light source(s). For some types of light sources, including LED-based sources, this may be accomplished effectively using a pulse width modulation (PWM) technique.

In one exemplary implementation of a PWM control technique, for each channel of a lighting unit a fixed predetermined voltage $V_{source}$ is applied periodically across a given light source constituting the channel. The application of the voltage $V_{source}$ may be accomplished via one or more switches, not shown in FIG. 3, controlled by the controller 105. While the voltage $V_{source}$ is applied across the light source, a predetermined fixed current $I_{source}$ (e.g., determined by a current regulator, also not shown in FIG. 3) is allowed to flow through the light source. Again, recall that an LED-based light source may include one or more LEDs, such that the voltage $V_{source}$ may be applied to a group of LEDs constituting the source, and the current $I_{source}$ may be drawn by the group of LEDs. The fixed voltage $V_{source}$ across the light source when energized, and the regulated current $I_{source}$ drawn by the light source when energized, determines the amount of instantaneous operating power $P_{source}$ of the light source ($P_{source}=V_{source} \cdot I_{source}$) As mentioned above, for LED-based light sources, using a regulated current mitigates potential undesirable or unpredictable variations in LED output that may arise if a variable LED drive current were employed.

According to the PWM technique, by periodically applying the voltage $V_{source}$ to the light source and varying the time the voltage is applied during a given on-off cycle, the average power delivered to the light source over time (the average operating power) may be modulated. In particular, the controller 105 may be configured to apply the voltage $V_{source}$ to a given light source in a pulsed fashion (e.g., by outputting a control signal that operates one or more switches to apply the voltage to the light source), preferably at a frequency that is greater than that capable of being detected by the human eye (e.g., greater than approximately 100 Hz). In this manner, an observer of the light generated by the light source does not perceive the discrete on-off cycles (commonly referred to as a "flicker effect"), but instead the integrating function of the eye perceives essentially continuous light generation. By adjusting the pulse width (i.e. on-time, or "duty cycle") of on-off cycles of the control signal, the controller varies the average amount of time the light source is energized in any given time period, and hence varies the average operating power of the light source. In this manner, the perceived brightness of the generated light from each channel in turn may be varied.

As discussed in greater detail below, the controller 105 may be configured to control each different light source channel of a multi-channel lighting unit at a predetermined average operating power to provide a corresponding radiant output power for the light generated by each channel. Alternatively, the controller 105 may receive instructions (e.g., "lighting commands") from a variety of origins, such as a user interface 118, a signal source 124, or one or more communication ports 120, that specify prescribed operating powers for one or more channels and, hence, corresponding radiant output powers for the light generated by the respective channels. By varying the prescribed operating powers for one or more channels (e.g., pursuant to different instructions or lighting commands), different perceived colors and brightness levels of light may be generated by the lighting unit.

In one embodiment of the lighting unit 100, as mentioned above, one or more of the light sources 104A, 104B, 104C, and 104D shown in FIG. 3 may include a group of multiple LEDs or other types of light sources (e.g., various parallel and/or serial connections of LEDs or other types of light sources) that are controlled together by the controller 105. Additionally, it should be appreciated that one or more of the light sources may include one or more LEDs that are adapted to generate radiation having any of a variety of spectra (i.e., wavelengths or wavelength bands), including, but not limited to, various visible colors (including essentially white light), various color temperatures of white light, ultraviolet, or infrared. LEDs having a variety of spectral bandwidths (e.g., narrow band, broader band) may be employed in various implementations of the lighting unit 100.

In some implementations of the lighting unit 100 shown in FIG. 3, the lighting unit 100 may be constructed and arranged to produce a wide range of variable color radiation. For example, in one embodiment, the lighting unit 100 may be particularly arranged such that controllable variable intensity (i.e., variable radiant power) light generated by two or more of the light sources combines to produce a mixed colored light (including essentially white light having a variety of color temperatures). In particular, the color (or color temperature) of the mixed colored light may be varied by varying one or more of the respective intensities (output radiant power) of the light sources (e.g., in response to one or more control signals output by the controller 105). Furthermore, the controller 105 may be particularly configured to provide control signals to one or more of the light sources so as to generate a variety of static or time-varying (dynamic) multi-color (or multi-color temperature) lighting effects. To this end, in one embodiment, the controller may include a processor 102 (e.g., a microprocessor) programmed to provide such control signals to one or more of the light sources. In various aspects, the processor 102 may be programmed to provide such control signals autonomously, in response to lighting commands, or in response to various user or signal inputs.

Thus, the lighting unit 100 may include a wide variety of colors of LEDs in various combinations, including two or more of red, green, and blue LEDs to produce a color mix, as well as one or more other LEDs to create varying colors and color temperatures of white light. For example, red, green and blue can be mixed with amber, white, UV, orange, IR or other colors of LEDs. Such combinations of differently colored LEDs in the lighting unit 100 can facilitate accurate reproduction of a host of desirable spectrums of lighting conditions, examples of which include, but are not limited to, a variety of outside daylight equivalents at different times of the day, various interior lighting conditions, lighting conditions to simulate a complex multicolored background, and the like. Other desirable lighting conditions can be created by removing particular pieces of spectrum that may be specifically absorbed, attenuated or reflected in certain environments. Water, for example tends to absorb and attenuate most non-blue and non-green colors of light, so underwater applications may benefit from lighting conditions that are tailored to emphasize or attenuate some spectral elements relative to others.

As shown in FIG. 3, the lighting unit 100 also may include a memory 114 to store various kinds of information. For example, the memory 114 may be employed to store one or more lighting commands or programs for execution by the processor 102 (e.g., to generate one or more control signals for the light sources), as well as various types of data useful for generating variable color radiation (e.g., calibration information, discussed further below). The memory 114 also may store one or more particular identifiers (e.g., a serial number, an address, etc.) that may be used either locally or on a system level to identify the lighting unit 100. In various embodiments, such identifiers may be pre-programmed by a manufacturer, for example, and may be either alterable or non-alterable thereafter (e.g., via some type of user interface located on the lighting unit, via one or more data or control signals received by the lighting unit, etc.). Alternatively, such identifiers may be determined at the time of initial use of the lighting unit in the field, and again may be alterable or non-alterable thereafter.

One issue that may arise in connection with controlling multiple light sources in the lighting unit 100 of FIG. 3, and controlling multiple lighting units 100 in a lighting system (e.g., as discussed below in connection with FIG. 4), relates to potentially perceptible differences in light output between substantially similar light sources. For example, given two virtually identical light sources being driven by respective identical control signals, the actual intensity of light (e.g., radiant power in lumens) output by each light source may be measurably different. Such a difference in light output may be attributed to various factors including, for example, slight manufacturing differences between the light sources, normal wear and tear over time of the light sources that may differently alter the respective spectrums of the generated radiation, etc. For purposes of the present discussion, light sources for which a particular relationship between a control signal and resulting output radiant power are not known are referred to as "uncalibrated" light sources.

The use of one or more uncalibrated light sources may result in generation of light having an unpredictable, or "uncalibrated," color or color temperature. For example, consider a first lighting unit including a first uncalibrated red light source and a first uncalibrated blue light source, each controlled in response to a corresponding lighting command having an adjustable parameter in a range of from zero to 255 (0-255), wherein the maximum value of 255 represents the maximum radiant power available (i.e., 100%) from the light source. For purposes of this example, if the red command is set to zero and the blue command is non-zero, blue light is generated, whereas if the blue command is set to zero and the red command is non-zero, red light is generated. However, if both commands are varied from non-zero values, a variety of perceptibly different colors may be produced (e.g., in this example, at very least, many different shades of purple are possible). In particular, perhaps a particular desired color (e.g., lavender) is given by a red command having a value of 125 and a blue command having a value of 200.

Now consider a second lighting unit including a second uncalibrated red light source substantially similar to the first uncalibrated red light source of the first lighting unit, and a second uncalibrated blue light source substantially similar to the first uncalibrated blue light source of the first lighting unit. As discussed above, even if both of the uncalibrated red light sources are controlled in response to respective identical commands, the actual intensity of light (e.g., radiant power in lumens) output by each red light source may be measurably different. Similarly, even if both of the uncalibrated blue light sources are controlled in response to respective identical commands, the actual light output by each blue light source may be measurably different.

With the foregoing in mind, it should be appreciated that if multiple uncalibrated light sources are used in combination in lighting units to produce a mixed colored light as discussed above, the observed color (or color temperature) of light produced by different lighting units under identical control conditions may be perceivably different. Specifically, consider again the "lavender" example above; the "first lavender" produced by the first lighting unit with a red command having a value of 125 and a blue command having a value of 200 indeed may be perceivably different than a "second lavender" produced by the second lighting unit with a red command having a value of 125 and a blue command having a value of 200. More generally, the first and second lighting units generate uncalibrated colors by virtue of their uncalibrated light sources.

In view of the foregoing, in one embodiment of the present invention, the lighting unit 100 includes calibration means to facilitate the generation of light having a calibrated (e.g., predictable, reproducible) color at any given time. In one aspect, the calibration means is configured to adjust (e.g., scale) the light output of at least some light sources of the lighting unit so as to compensate for perceptible differences between similar light sources used in different lighting units. For example, in one embodiment, the processor 102 of the lighting unit 100 is configured to control one or more of the light sources so as to output radiation at a calibrated intensity that substantially corresponds in a predetermined manner to a control signal for the light source(s). As a result of mixing radiation having different spectra and respective calibrated intensities, a calibrated color is produced. In one aspect of this embodiment, at least one calibration value for each light source is stored in the memory 114, and the processor is programmed to apply the respective calibration values to the control signals (commands) for the corresponding light sources so as to generate the calibrated intensities. In one version of this embodiment, one or more calibration values may be determined once (e.g., during a lighting unit manufacturing/testing phase) and stored in the memory 114 for use by the processor 102. In another version, the processor 102 may be configured to derive one or more calibration values dynamically (e.g. from time to time) with the aid of one or more photosensors, for example. In various embodiments, the photosensor(s) may be one or more external components coupled to the lighting unit, or alternatively may be integrated as part of the lighting unit itself. A photosensor is one example of a signal source that may be integrated or otherwise associated with the lighting unit 100, and monitored by the processor 102 in connection with the operation of the lighting unit. Other examples of such signal sources are discussed further below, in connection with the signal source 124 shown in FIG. 3.

One exemplary method that may be implemented to derive one or more calibration values includes applying a reference control signal to a light source (e.g., corresponding to maximum output radiant power), and measuring (e.g., via one or more photosensors) an intensity of radiation (e.g., radiant power falling on the photosensor) thus generated by the light source. The processor may be programmed to then make a comparison of the measured intensity and at least one reference value (e.g., representing an intensity that nominally would be expected in response to the reference control signal). Based on such a comparison, the processor may determine one or more calibration values (e.g., scaling factors) for the light source. In particular, the processor may derive a calibration value such that, when applied to the reference control signal, the light source outputs radiation having an intensity that corresponds to the reference value (i.e., an "expected" intensity, e.g., expected radiant power in lumens).

In various embodiments, one calibration value may be derived for an entire range of control signal/output intensities for a given light source. Alternatively, multiple calibration values may be derived for a given light source (i.e., a number of calibration value "samples" may be obtained) that are respectively applied over different control signal/output intensity ranges, to approximate a nonlinear calibration function in a piecewise linear manner.

Still referring to FIG. 3, in many embodiments, the apparatus 55 optionally includes one or more user interfaces 118 associated with the lighting units 100 to facilitate any of a number of user-selectable settings or functions (e.g., generally controlling the light output of the lighting unit 100, changing and/or selecting various pre-programmed lighting effects to be generated by the lighting unit, changing and/or selecting various parameters of selected lighting effects, setting particular identifiers such as addresses or serial numbers for the lighting unit, etc.). In various embodiments, the communication between the user interface 118 and the lighting unit may be accomplished through wire or cable, or wireless transmission.

The controller 105 of the lighting unit may monitor the user interface 118 and controls one or more of the light sources 104A, 104B, 104C and 104D based at least in part on a user's operation of the interface. For example, the controller 105 may be configured to respond to operation of the user interface by originating one or more control signals for controlling one or more of the light sources. Alternatively, the processor 102 may be configured to respond by selecting one or more pre-programmed control signals stored in memory, modifying control signals generated by executing a lighting program, selecting and executing a new lighting program from memory, or otherwise affecting the radiation generated by one or more of the light sources.

In one particular implementation, the user interface 118 may employ one or more switches (e.g., a standard wall switch) that interrupt power to the controller 105. In one aspect of this implementation, the controller 105 is configured to monitor the power as controlled by the user interface, and in turn control one or more of the light sources based at least in part on duration of a power interruption caused by operation of the user interface. As discussed above, the controller may be particularly configured to respond to a predetermined duration of a power interruption by, for example, selecting one or more pre-programmed control signals stored in memory, modifying control signals generated by executing a lighting program, selecting and executing a new lighting program from memory, or otherwise affecting the radiation generated by one or more of the light sources.

FIG. 3 also illustrates that, in some embodiments, the lighting unit 100 may be configured to receive one or more signals 122 from one or more other signal sources 124. In one implementation, the controller 105 of the lighting unit may use the signal(s) 122, either alone or in combination with other control signals (e.g., signals generated by executing a lighting program, one or more outputs from a user interface, etc.), so as to control one or more of the light sources 104A, 104B, 104C and 104D in a manner similar to that discussed above in connection with the user interface. Examples of the signal(s) 122 that may be received and processed by the controller 105 include, but are not limited to, one or more audio signals, video signals, power signals, various types of data signals, signals representing information obtained from a network (e.g., the Internet), signals representing one or more detectable/sensed conditions, signals from lighting units, signals consisting of modulated light, etc. In various embodiments, the signal source(s) 124 may be located remotely from the lighting unit 100, or included as a component of the lighting unit. In one particular embodiment, a signal from one lighting unit 100 could be sent over a network to another lighting unit 100.

Some examples of a signal source 124 that may be employed in, or used in connection with, the lighting unit 100 include any of a variety of sensors or transducers that generate one or more signals 122 in response to some stimulus. Examples of such sensors include, but are not limited to, various types of environmental condition sensors, such as thermally sensitive (e.g., temperature, infrared) sensors, humidity sensors, motion sensors, photosensors/light sensors (e.g., photodiodes, sensors that are sensitive to one or more particular spectra of electromagnetic radiation such as spectroradiometers or spectrophotometers, etc.), various types of cameras, sound or vibration sensors or other pressure/force transducers (e.g., microphones, piezoelectric devices), and the like. Additional examples of the signal source 124 include various metering/detection devices that monitor electrical signals or characteristics (e.g., voltage, current, power, resistance, capacitance, inductance, etc.) or chemical/biological characteristics (e.g., acidity, a presence of one or more particular chemical or biological agents, bacteria, etc.) and provide one or more signals 122 based on measured values of the signals or characteristics. Yet other examples of the signal source 124 include various types of scanners, image recognition systems, voice or other sound recognition systems, artificial intelligence and robotics systems, and the like. The signal source 124 could also be another lighting unit, another controller or processor, or any one of many available signal generating devices, such as media players, MP3 players, computers, DVD players, CD players, television signal sources, camera signal sources, microphones, speakers, telephones, cellular phones, instant messenger devices, SMS devices, wireless devices, personal organizer devices, and many others.

In some embodiments, the lighting unit 100 also may include one or more optical elements 130 to optically process the radiation generated by the light sources 104A, 104B, 104C, and 104D. For example, one or more optical elements may be configured so as to change one or both of a spatial distribution and a propagation direction of the generated radiation. In particular, one or more optical elements may be configured to change a diffusion angle of the generated radiation. In one aspect of this embodiment, one or more optical elements 130 may be particularly configured to variably change one or both of a spatial distribution and a propagation direction of the generated radiation (e.g., in response to some electrical and/or mechanical stimulus). Examples of optical elements that may be included in the lighting unit 100 include, but are not limited to, reflective materials, refractive materials, translucent materials, filters, lenses, mirrors, and fiber optics. The optical element 130 also may include a phosphorescent material, luminescent material, or other material capable of responding to or interacting with the generated radiation. In one aspect, the member 55 of the apparatus 50 shown in FIGS. 1A-1B and 2 may itself serve as the optical element 130.

As also shown in FIG. 3, the lighting unit 100 may include one or more communication ports 120 to facilitate coupling of the lighting unit 100 to any of a variety of other devices. For example, one or more communication ports may facilitate coupling multiple lighting units together as a networked lighting system, in which at least some of the lighting units are addressable (e.g., have particular identifiers or addresses) and are responsive to particular data transported across the network. In particular, in a networked lighting system environment, as discussed in greater detail further below (e.g., in connection with FIG. 4), as data is communicated via the network, the controller 105 of each lighting unit coupled to the network may be configured to be responsive to particular data (e.g., lighting control commands) that pertain to it (e.g., in some cases, as dictated by the respective identifiers of the networked lighting units). Once a given controller identifies particular data intended for it, it may read the data and, for example, change the lighting conditions produced by its light sources according to the received data (e.g., by generating appropriate control signals to the light sources). In one aspect, the memory of each lighting unit coupled to the network may be loaded, for example, with a table of lighting control signals that correspond with data the processor 102 of the controller receives. Once the processor 102 receives data from the network, the processor may consult the table to select the control signals that correspond to the received data, and control the light sources of the lighting unit accordingly.

In one version of this embodiment, the processor 102 of a given lighting unit, whether or not coupled to a network, may be configured to interpret lighting instructions/data that are received in a DMX protocol (as discussed, for example, in U.S. Pat. Nos. 6,016,038 and 6,211,626), which is a lighting command protocol conventionally employed in the lighting industry for some programmable lighting applications. For example, in one aspect, considering for the moment a lighting unit based on red, green and blue LEDs (i.e., an "R-G-B" lighting unit), a lighting command in DMX protocol may specify each of a red channel command, a green channel command, and a blue channel command as eight-bit data (i.e., a data byte) representing a value from 0 to 255. The maximum value of 255 for any one of the color channels instructs the processor 102 to control the corresponding light source(s) to operate at maximum available power (i.e., 100%) for the channel, thereby generating the maximum available radiant power for that color (such a command structure for an R-G-B lighting unit commonly is referred to as 24-bit color control). Hence, a command of the format [R, G, B]=[255, 255, 255] would cause the lighting unit to generate maximum radiant power for each of red, green and blue light (thereby creating white light).

It should be appreciated, however, that lighting units suitable for purposes of the present invention are not limited to a DMX command format, as lighting units according to various embodiments may be configured to be responsive to other types of communication protocols/lighting command formats so as to control their respective light sources. In general, the processor 102 may be configured to respond to lighting commands in a variety of formats that express prescribed operating powers for each different channel of a multi-channel lighting unit according to some scale representing zero to maximum available operating power for each channel.

In various embodiments, the lighting units 100 include and/or are coupled to one or more power sources 108, such as AC power sources, DC power sources, batteries, solar-based power sources, thermoelectric or mechanical-based power sources and the like. Additionally, the power source(s) may include or be associated with one or more power conversion devices that convert power received by an external power source to a form suitable for operation of the lighting unit 100.

The lighting unit 100 may be implemented in any one of several different structural configurations without deviating from the scope or spirit of the present invention. Examples of such configurations include, but are not limited to, an essentially linear or curvilinear configuration, a circular configuration, an oval configuration, a rectangular configuration, combinations of the foregoing, various other geometrically shaped configurations, various two or three dimensional configurations, and the like. A given lighting unit also may have any one of a variety of mounting arrangements for the light source(s), enclosure/housing arrangements and shapes to partially or fully enclose the light sources, and/or electrical and mechanical connection configurations. In particular, in some implementations, various components of the lighting unit may be coupled to or otherwise integrated with a plane of material to form the apparatus having a luminous writing surface, as illustrated generally and discussed above in connection with FIGS. 1 and 2.

Additionally, the various components of the lighting unit discussed above (e.g., processor, memory, power, user interface, etc.), as well as other components that may be associated with the lighting unit in different implementations (e.g., sensors/transducers, other components to facilitate communication to and from the unit, etc.) may be packaged in a variety of ways; for example, in some embodiments, any subset or all of the various lighting unit components, as well as other components that may be associated with the lighting unit, may be packaged together. In other embodiments, packaged subsets of components may be coupled together electrically and/or mechanically in a variety of ways.

Figure 4:
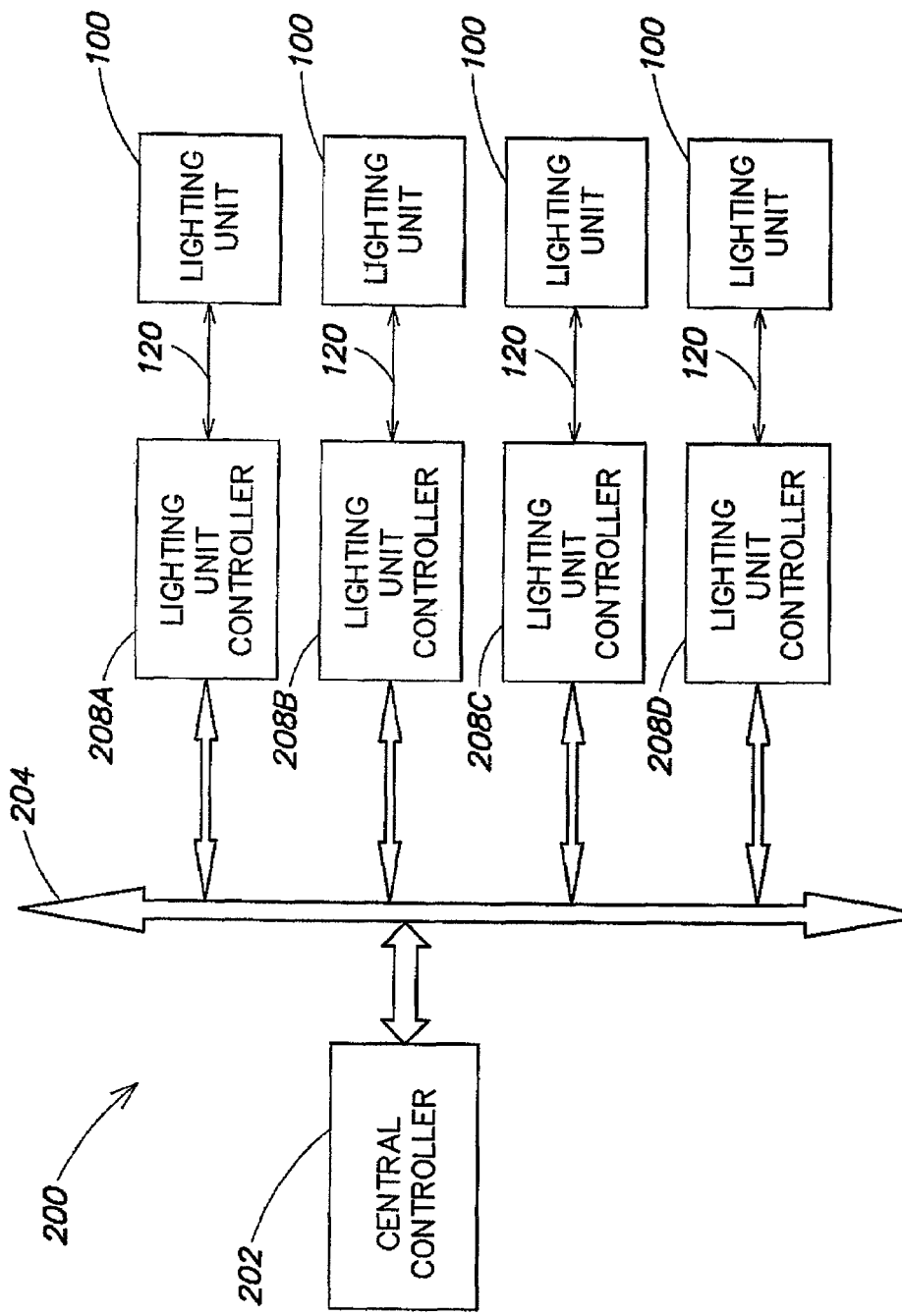
FIG. 4 is a diagram illustrating a networked lighting system that may be implemented with one or more apparatus shown in FIGS. 1A-1B and 2.

Referring to FIG. 4, in one embodiment, a networked lighting system 200 includes a number of lighting units 100, such as those discussed above in connection with FIG. 3, which are coupled together to form the networked lighting system. It should be appreciated, however, that the particular configuration and arrangement of lighting units shown in FIG. 4 is for purposes of illustration only, and that the invention is not limited to the particular system topology.

In various embodiments, multiple networked lighting units may be employed with a common planar member to provide a luminous writing surface apparatus in which different "zones" of the luminous writing surface may be controlled independently to provide a wide variety of background colors in different portions of the writing surface. Alternatively, multiple networked lighting units may be employed in multiple luminous writing surface apparatus to provide a system implementation of multiple independently controllable luminous writing surfaces. Such a system may be disposed in a variety of environments, such as academic and office environments. Additionally, it should be appreciated that the networked lighting system 200 may be configured flexibly to include one or more user interfaces, as well as one or more signal sources such as sensors/transducers. For example, one or more user interfaces and/or one or more signal sources such as sensors/transducers (as discussed above in connection with FIG. 3) may be associated with any one or more of the lighting units of the networked lighting system. Alternatively (or in addition to the foregoing), one or more user interfaces and/or one or more signal sources may be implemented as "stand alone" components in the networked lighting system 200. Whether stand alone components or particularly associated with one or more lighting units 100, these devices may be "shared" by the lighting units of the networked lighting system. Stated differently, one or more user interfaces and/or one or more signal sources such as sensors/transducers may constitute "shared resources" in the networked lighting system that may be used in connection with controlling any one or more of the lighting units of the system.

As shown in FIG. 4, the lighting system 200 may include one or more lighting unit controllers (hereinafter "LUCs") 208A, 208B, 208C, and 208D, wherein each LUC is responsible for communicating with and generally controlling one or more lighting units 100 coupled to it. Although FIG. 4 illustrates one lighting unit coupled to each LUC, it should be appreciated that the invention is not limited in this respect, as different numbers of lighting units may be coupled to a given LUC in a variety of different configurations (serially connections, parallel connections, combinations of serial and parallel connections, etc.) using a variety of different communication media and protocols. Each LUC in turn may be coupled to a central controller 202 that is configured to communicate with one or more LUCs. Although FIG. 4 shows four LUCs coupled to the central controller via a generic connection 204 (which may include any number of a variety of conventional coupling, switching and/or networking devices), it should be appreciated that according to various embodiments, different numbers of LUCs may be coupled to the central controller 202. Additionally, according to various embodiments of the present invention, the LUCs and the central controller may be coupled together in a variety of configurations using a variety of different communication media and protocols to form the networked lighting system 200. Moreover, it should be appreciated that the interconnection of LUCs and the central controller, and the interconnection of lighting units to respective LUCs, may be accomplished in different manners (e.g., using different configurations, communication media, and protocols).

For example, according to one embodiment of the present invention, the central controller 202 may by configured to implement Ethernet-based communications with the LUCs, and in turn the LUCs may be configured to implement DMX-based communications with the lighting units 100. In particular, in one version of this embodiment, each LUC may be configured as an addressable Ethernet-based controller and accordingly may be identifiable to the central controller via a particular unique address (or a unique group of addresses) using an Ethernet-based protocol. In this manner, the central controller may be configured to support Ethernet communications throughout the network of coupled LUCs, and each LUC may respond to those communications intended for it. In turn, each LUC may communicate lighting control information to one or more lighting units coupled to it, for example, via a DMX protocol, based on the Ethernet communications with the central controller. More specifically, in particular embodiments, the LUCs 208A, 208B, and 208C may be configured to be "intelligent" in that the central controller 202 may be configured to communicate higher level commands to the LUCs that need to be interpreted by the LUCs before lighting control information can be forwarded to the lighting units 100. For example, a lighting system operator may want to generate a color changing effect that varies colors from lighting unit to lighting unit in such a way as to generate the appearance of a propagating rainbow of colors ("rainbow chase"), given a particular placement of lighting units with respect to one another. In this example, the user may provide a simple instruction to the central controller 202 to accomplish this, and in turn the central controller may communicate to one or more LUCs using an Ethernet-based protocol high level command to generate a "rainbow chase." The command may contain timing, intensity, hue, saturation or other relevant information, for example. When a given LUC receives such a command, it may then interpret the command and communicate further commands to one or more lighting units using a DMX protocol, in response to which the respective sources of the lighting units are controlled via any of a variety of signaling techniques (e.g., PWM).

It should again be appreciated that the foregoing example of using multiple different communication implementations (e.g., Ethernet/DMX) in a lighting system according to certain embodiments of the present invention is for purposes of illustration only, and that the invention is not limited to this particular disclosed example. From the foregoing, it may be appreciated that one or more lighting units as discussed above are capable of generating highly controllable variable color light over a wide range of colors, as well as variable color temperature white light over a wide range of color temperatures. Such lighting units, and components thereof, may be employed in a variety of configurations to provide luminous writing surface apparatus according to various embodiments of the present invention.

Having thus described several illustrative embodiments, it is to be appreciated that various alterations, modifications, and improvements will readily occur to those skilled in the art. Such alterations, modifications, and improvements are intended to be part of the above description, and are intended to fall within the spirit and scope of the claimed invention. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. An apparatus having a luminous writing surface configured to receive a removable marking thereon, the apparatus comprising:

an essentially planar member having a front surface, at least one side surface, and a back surface, the front surface comprising the writing surface;

at least one light source associated with the essentially planar member for irradiating at least one of the side surface and the back surface thereof with visible light perceivable by an observer from the front surface, the visible light providing at least one background color for the removable marking when received on the writing surface; and at least one controller coupled to the at least one light source and configured to control at least one of a color, a color temperature and an intensity of the visible light so as to provide the at least one background color, wherein the at least one controller is configured to control the at least one background color based at least in part on (i) ambient light in an environment around the apparatus and/or (ii) a color of the removable marking.

2. The apparatus of claim 1, wherein the essentially planar member is configured to both facilitate diffusion of the visible light over a substantial portion of the writing surface and receive the removable marking over the substantial portion of the writing surface.

3. The apparatus of claim 1, wherein the essentially planar member comprises essentially rigid material.

4. The apparatus of claim 1, wherein the essentially planar member comprises flexible material.

5. The apparatus of claim 1, wherein at least one of the front surface, side surface, and the back surface of the essentially planar member comprises a pattern formed thereon.

6. The apparatus of claim 1, wherein at least one of the front surface, side surface, and the back surface of the essentially planar member is mechanically altered for interacting with the visible light.

7. The apparatus of claim 1, wherein the essentially planar member comprises glass-based, polycarbonate, or acrylic material.

8. The apparatus of claim 1, wherein the essentially planar member comprises a translucent or transparent material and wherein the at least one light source is disposed in a plane substantially parallel to the back surface thereof so as to irradiate the back surface with the visible light and provide substantially homogeneous illumination of the front surface.

9. The apparatus of claim 1, wherein the essentially planar member comprises a coating disposed over the back surface for facilitating diffusion of the visible light.

10. The apparatus of claim 1, wherein the at least one light source includes at least one LED-based light source.

11. The apparatus of claim 1, wherein the color of the visible light includes at least one non-white color.

12. The apparatus of claim 1, wherein the visible light includes essentially white light.

13. The apparatus of claim 1, where the at least one controller is configured to control the at least one background color so as to alter a contrast between the removable marking and the writing surface.

14. The apparatus of claim 1, wherein the removable marking includes at least two markings having different colors, and wherein the at least one controller is configured to control the at least one background color so as to increase a contrast between the at least two markings.

* * * * *